United States Patent
Bowers et al.

(10) Patent No.: US 9,645,908 B2
(45) Date of Patent: May 9, 2017

(54) CONFIGURABLE INDICATOR ON COMPUTING DEVICE

(71) Applicant: GOOGLE INC., Mountain View, CA (US)

(72) Inventors: Andrew Bowers, San Francisco, CA (US); Felix Jose Alvarez Rivera, San Jose, CA (US); Neil Hendin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/052,370

(22) Filed: Feb. 24, 2016

(65) Prior Publication Data
US 2016/0170858 A1    Jun. 16, 2016

Related U.S. Application Data

(63) Continuation of application No. 13/660,833, filed on Oct. 25, 2012, now Pat. No. 9,305,439.

(51) Int. Cl.
| | |
|---|---|
| *G08B 5/22* | (2006.01) |
| *G06F 11/32* | (2006.01) |
| *G08B 5/36* | (2006.01) |
| *G06F 1/16* | (2006.01) |

(52) U.S. Cl.
CPC .......... *G06F 11/328* (2013.01); *G06F 1/1684* (2013.01); *G08B 5/36* (2013.01)

(58) Field of Classification Search
CPC ........ G06F 11/324; G06F 1/1684; G08B 5/36
USPC ............ 340/815.15, 10.1, 10.2; 345/1.1, 204
See application file for complete search history.

(56) References Cited

U.S. PATENT DOCUMENTS

| | | | |
|---|---|---|---|
| 5,305,238 A | 4/1994 | Starr, III et al. | |
| 6,658,577 B2 | 12/2003 | Huppi et al. | |
| 7,221,331 B2 | 5/2007 | Bear et al. | |
| 8,340,721 B2 | 12/2012 | Moran et al. | |
| 2004/0222977 A1* | 11/2004 | Bear ..................... | G06F 11/328 345/184 |
| 2006/0007051 A1* | 1/2006 | Bear .................... | G06Q 10/107 345/1.1 |

(Continued)

FOREIGN PATENT DOCUMENTS

| | | |
|---|---|---|
| CN | 101470882 A | 7/2009 |
| EP | 1594046 A2 | 11/2005 |
| KR | 10-2011-0027930 A | 3/2011 |

OTHER PUBLICATIONS

International Search Report and Written Opinion for PCT Patent Application No. PCT/US2013/065959, mailed on Feb. 10, 2014, 9 pages.

(Continued)

*Primary Examiner* — Ojiako Nwugo
(74) *Attorney, Agent, or Firm* — Brake Hughes Bellermann LLP

(57) ABSTRACT

A computing device may include a policy agent configured to receive activity information, apply at least one display policy to the activity information, and determine at least one command based on results of the at least one display policy being applied to the activity information, and a multi-colored indicator unit, located on a non-display screen area of the computing device, configured to display at least one of a plurality of colors based on the at least one command.

17 Claims, 6 Drawing Sheets

(56) References Cited

U.S. PATENT DOCUMENTS

| | | | | |
|---|---|---|---|---|
| 2008/0024470 | A1* | 1/2008 | Andre | G09F 9/30 345/204 |
| 2008/0094350 | A1 | 4/2008 | Pickover | |
| 2009/0019388 | A1 | 1/2009 | Zhang et al. | |
| 2009/0295976 | A1* | 12/2009 | Choi | H04N 5/23293 348/333.11 |
| 2009/0298537 | A1* | 12/2009 | Choi | H04M 1/72583 455/556.1 |
| 2010/0327774 | A1 | 12/2010 | Kerr et al. | |
| 2011/0260864 | A1 | 10/2011 | Dearborn et al. | |
| 2014/0118155 | A1 | 5/2014 | Bowers et al. | |
| 2014/0192467 | A1 | 7/2014 | Kwong | |
| 2014/0193606 | A1* | 7/2014 | Kwong | C30B 29/20 428/138 |

OTHER PUBLICATIONS

International Preliminary Report on Patentability for PCT Patent Application No. PCT/US2013/065959, mailed on Jan. 2, 2015, 1 page.
Written Opinion for PCT Patent Application No. PCT/US2013/065959, mailed on Jan. 2, 2015, 5 pages.
International Preliminary Report on Patentability for PCT Patent Application No. PCT/US2013/065959. mailed on May 11, 2015, 11 pages.
Non-Final Office Action Received for U.S. Appl. No. 13/660,833, mailed on Dec. 4, 2014, 10 pages.
Response to Non-Final Office Action for U.S. Appl. No. 13/660,833, filed Mar. 3, 2015, 8 pages.
Final Office Action Received for U.S. Appl. No. 13/660,833, mailed on Jun. 3, 2015, 11 pages.
Response to Final Office Action for U.S. Appl. No. 13/660,833, filed Sep. 2, 2015, 9 pages.
Advisory Action Received for U.S. Appl. No. 13/660,833, mailed on Sep. 18, 2015, 3 pages.
Notice of Allowance Received for U.S. Appl. No. 13/660,833, mailed on Nov. 30, 2015, 9 pages.
13849054.5, "Extended European Search Report Received", Jun. 7, 2016, 11 Pages.
Office Action with English Translation from CN201380055978.1, mailed Feb. 22, 2017, 19 pages.

* cited by examiner

CONFIGURABLE INDICATOR ON COMPUTING DEVICE

CROSS REFERENCE TO RELATED APPLICATIONS

This application claims priority to and is a Continuation of U.S. application Ser. No. 13/660,833, filed Oct. 25, 2012, entitled "CONFIGURABLE INDICATOR ON COMPUTING DEVICE", the disclosure of which is incorporated by reference herein in its entirety.

BACKGROUND

Conventional computing devices such as laptops may have a light-emitting diode (LED) indicator on the front/back of the device, which may indicate an operating status such as on, sleep, and charge. This LED indicator has a single color LED, and is driven by internal CPU controllers. However, the internal CPU controllers do not have the capabilities of controlling the LED indicator in a configurable manner in order to indicate many types of information besides the operating status of a computer.

SUMMARY

The details of one or more implementations are set forth in the accompa-nying drawings and the description below. Other features will be apparent from the description and drawings, and from the claims.

A computing device may include a policy agent configured to receive activity information, apply at least one display policy to the activity information, and determine at least one command based on results of the at least one display policy being applied to the activity information, and a multi-colored indicator unit, located on a non-display screen area of the computing device, configured to display at least one of a plurality of colors based on the at least one command.

The at least one display policy may include at least one of an enterprise policy, an administrator policy, a user preference, and an application setting. The policy agent may be further configured to determine which display policy to apply based on a hierarchical order of a plurality of display policies.

According to one implementation, the computing device may be a laptop computer having a display screen portion, and the non-display screen area may include a backside of the laptop computer opposite to the display screen portion.

According to another implementation, the computing device may be a desktop computer having a display apparatus connected to a computer processing unit, the display apparatus may include a display screen portion, and the non-display screen area may include a backside of the display apparatus opposite to the display screen portion.

The multi-colored indicator unit may include a plurality of segments, and each segment of the plurality of segments may be capable of independently displaying a color, where the multi-colored indicator unit may further include an optical diffusion and mounting assembly having the plurality of segments.

The activity information may include Internet activity, and the at least one display policy may include an Internet usage control policy relating to control of the Internet activity. The policy agent may be configured to apply the Internet usage control policy to the Internet activity and determine the at least one command based on results of the Internet usage control policy being applied to the Internet activity.

The Internet usage control policy may relate to a parental control policy. The multi-colored indicator unit may be configured to display one of a green color for safe Internet browsing, yellow color for cautious Internet browsing, a red color for unsafe Internet browsing, based on the at least one command.

The activity information may include user action information indicating at least one user action. The activity information may include an application request from an application. The activity information may include maintenance upgrade information or a number of errors associated with the computing device.

A method for controlling and displaying colors via an indicator on a computing device, may include receiving, by a policy agent, activity information, applying, by the policy agent, at least one display policy to the activity information, determining, by the policy agent, at least one command based on results of the at least one display policy being applied to the activity information, and displaying, by a multi-colored indicator unit located on a non-display screen area of the computing device, at least one of a plurality of colors based on the at least one command.

The at least one display policy may include at least one of an enterprise policy, an administrator policy, a user preference, and an application setting. The method may further include determining, by the policy agent, which display policy to apply based on a hierarchical order of a plurality of display policies.

The activity information may include Internet activity, and the at least one display policy may include an Internet usage control policy relating to control of the Internet activity. The applying step may apply the Internet usage control policy to the Internet activity and the determining step may determine the at least one command based on results of the Internet usage control policy being applied to the Internet activity.

The Internet usage control policy may relate to a parental control policy. The displaying step may display one of a green color for safe Internet browsing, yellow color for cautious Internet browsing, a red color for unsafe Internet browsing, based on the at least one command.

The activity information may include user action information indicating at least one user action. The activity information may include an application request from an application.

DETAILED DESCRIPTION

As described herein, a multi-colored light-emitting diode (LED) indicator unit on a computing device, such as a laptop or desktop computer, can be controlled. In one implementation, the multi-colored LED indicator unit may be located on a non-display screen area of the computing device. For example, the multi-colored LED indicator unit may be located on the backside of the laptop computer (e.g., opposite to the display screen portion of the laptop computer) or on the backside of a display apparatus of the personal computer (e.g., opposite to the display screen portion of the display apparatus). Alternatively, the multi-colored LED indicator unit may be located on the computer processing unit (CPU) of the personal computer. Regardless of the location, the multi-colored LED indicator unit may include at least one segment, where each segment is capable of displaying a plurality of colors such as green, yellow, and red, among others, for example. As such, the multi-colored LED indicator unit may simultaneously display multiple colors.

Also, according to the implementations, the multi-colored LED indicator unit may be configured to display multiple colors according to a number of different aspects apart from whether the computing device is charging, on, or asleep. For example, the implementations provide an independent controller that controls the multi-colored indicator unit, which may illuminate based on the application of at least one display policy to activity information including Internet activity (e.g. green=safe web browsing, yellow=cautious web browsing, red=unsafe web browsing, etc.), user action information, application requests, service information, or, generally, any type of activity associated with the computing device or a user operating the computing device. Also, the user can set a preferred color scheme depending on the type of action.

Figure 1:
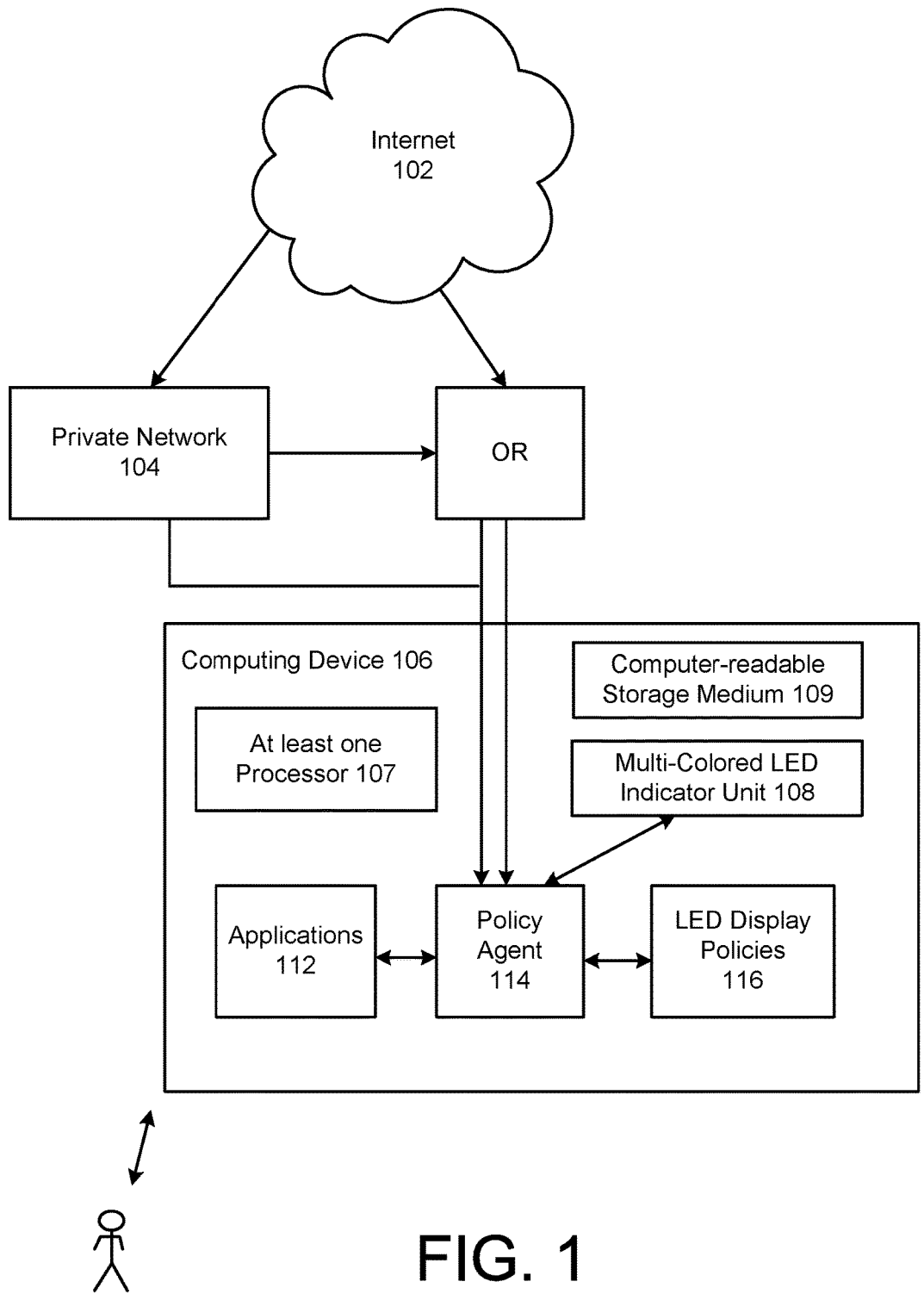
FIG. 1 illustrates a computing device for controlling and displaying a plurality of colors on a multi-colored LED indicator unit based on one or more LED display policies according to an implementation.

FIG. 1 illustrates a computing device 106 for controlling and displaying at least one of plurality of colors on a multi-colored LED indicator unit 108 based on one or more LED display policies 116 according to an implementation. The computing device 106 may be virtually any type of computing device such as a laptop or desktop computer, a netbook, or a tablet computer, for example. An implementation of the computing device 106 as a laptop computer, and an implementation of the computing device 106 as a desktop computer are further illustrated in FIGS. 5A and 5B. However, the features and functionalities of the implementations discussed herein with respect to the laptop and desktop computers can be easily extended to other types of computing devices.

The computing device 106 may include at least one processor 107 and a non-transitory computer-readable storage medium 109. The non-transitory computer-readable storage medium 109 may include executable instructions, that when executed, cause the at least one processor 107 to implement functionalities of applications 112, the multi-colored LED indicator unit 108, a policy agent 114, and the LED display polices 116 in conjunction with an operating system associated with the computing device 106. The operating system may include an operating system such as the Windows operating system, Mac OS, or Linux, and may include mobile platforms such as Android, Symbian, or iPhone OS, to name a few examples. In other examples, the operating system may include a browser-based operating system, such as the Chrome OS. Consequently, the applications 112 may include virtually any application which may run on any underlying operating system or platform. Examples of such applications are well-known and too numerous to mention in any detail, but generally include document processing applications, gaming applications, email applications, image editing or presentation software, a web browser, and/or virtually any type of application capable of operating on an operating system.

As shown in FIG. 1, the computing device 106 may be capable of being connected to the Internet 102 or a private network 104 which is then connected to the Internet 102. The private network 104 may represent a corporate or other intranet, and/or a smaller-scale, local or personal network, any of which may be implemented using standard network technology.

The policy agent 114 may be configured to receive activity information, apply at least one LED display policy among a plurality of LED display policies 116, and determine at least one command based on the results of the at least one LED display policy being applied to the activity information. The determined command(s) are provided to the multi-colored LED indictor unit 108 for displaying the color scheme. For instance, the multi-colored LED indicator unit 108 may include the hardware associated with simultaneously displaying multiple colors on the computing device 106 based on one or more commands from the policy agent 114, which is further explained with reference to FIG. 3.

In one implementation, the activity information may include network activity information associated with the private network 104 and/or the Internet 102. For example, the network activity information may include which information the user has accessed within the private network 104 and/or the Internet 102 such as files, documents, and/or websites, for example, which may include the Internet browsing activities of the user. In this example, the policy agent 114 may receive the network activity information from the private network 104 and/or the Internet 102, and apply at least one LED display policy to the network activity information. The LED display policy may define one or more conditions associated with the network activity information in order to determine one or more commands to be provided to the multi-colored LED indicator unit 108 for displaying the plurality of colors on the multiple-colored LED indicator unit 108. For example, the LED display policy may require display of a green color if the network information indicates that the user has visited/or is visiting safe Internet sites, a yellow color if the network information indicates that the user has visited/or is visiting semi-safe Internet sites, and a red color if the network information indicates that the user has visited/or is visiting unsafe Internet sites.

In one example, the terms "safe", "semi-safe" and "unsafe" may refer to different levels of Internet activity, which may depend on the context for which the computing device 106 is utilized. For instance, in terms of utilizing the computing device 106 within a work place environment, the various levels of Internet activity (e.g., safe, semi-safe, and unsafe) may relate to the security of the Internet site and/or the relevancy of the Internet site to the user's work. In terms of utilizing the computing device 106 within a home environment, the various levels of Internet activity may relate to the appropriateness of the Internet site such as a parental control policy, as further discussed below. Therefore, the policy agent 114 may receive the network information indicating which websites the user is viewing, and apply the LED display policy accordingly. Based on the application of the LED display policy to the network information, the policy agent 114 may determine the appropriate command(s) to be provided to the multi-colored LED indicator unit 108.

Also, the LED display policy may relate to a parental control policy in order to monitor their children's Internet activity. In one implementation, the policy agent 114 may operate in conjunction with existing network filtering mechanisms already associated with the operating system and/or web browsers or search engines. For example, these existing network filtering mechanisms may provide parental controls, and filter (or block) the Internet activity of the user when the visited web page(s) meet a condition specified by the parental filter. In this example, the policy agent 114 may be notified when the filtering mechanism is activated causing the policy agent 114 to apply the parental control policy to the type of Internet activity classified by the network filtering mechanism. For instance, for cases of unsafe Internet activity, the parental control policy may require the display of a red color. For cases of safe Internet activity, the parental control policy may require the display of a green color, and for cases of semi-safe Internet activity, the parental control policy may require the display of a yellow color. However, the implementations encompass any kind of color for the color scheme of the parental control policy, as well as other types of policies.

In another implementation, the activity information may include user action information indicating at least one user action. For example, the policy agent 114 may be configured to receive user action information that represents an action by the user on the computing device 106. The user action information may include virtually any type of actions performed by the user such as launching a certain type of application 112, and operating the application 112/computing device 106 in a specified manner, for example. In this respect, the user may define virtually any type of LED display policy for controlling the color display of the multi-colored LED indicator unit 108. In one example, the user may define an LED display policy such requiring that the color red is displayed when the user launches an application 112 relating to work. In this example, the policy agent 114 may monitor and/or receive a variety of different user actions, and apply the user-defined LED display policy accordingly. When the user action information meets a condition specified by the LED display policy, the policy agent 114 may generate the appropriate command(s) to be provided to the multi-colored LED indicator unit 108 for controlling the display of color indicators.

In another example, the LED display policy may represent an enterprise policy to be applied to users, who are authorized to operate a company's computers. For example, enterprise users may set a company wide standard indicator scheme to allow users to have outward facing indicators (e.g., the multi-colored LED indicator unit 108 may be positioned on the backside of the computing device 106) such as chat status, e.g., red=busy, yellow=please be brief, and green=come and chat. In this example, the user may set his/her chat status via a chat status interface. Then, the policy agent 114 may receive the selected chat status and determine the appropriate command(s) for controlling the multi-colored LED indicator unit 108 based on the enterprise's LED display policy.

In another example, the enterprise LED display policy may relate to the number of bugs open against the user, e.g., red=one or more critical bugs, yellow=one or more non-critical bugs, green=no bugs. Also, the enterprise LED policy may relate to the status of a system update, e.g., red=the system update is taking place, and green=the system update is complete. As such, the activity information may relate to maintenance upgrade information or a number of errors associated with the computing device 106. Therefore, the policy agent 114 may receive the maintenance upgrade information or the number of errors associated with the computing device 106 from the computing device 106 or another device, and apply the enterprise LED policy to determine the appropriate command(s) for controlling the multi-colored LED indictor unit 108.

Furthermore, the policy agent 114 may receive one or more application requests from an application 112 to display particular colors of the LED indicator unit 108 in accordance with certain functionality of the application 112. In one example, the application 112 may include a game such as Battleship (which is a naval strategy guessing game), and the application request may be related to a round of play of the game, e.g., the sinking of a ship, or a miss. Then, depending on the LED display policy (which may include one or more application settings) the multi-colored LED indicator unit 108 may be configured to display a flashing (or flickering) red color when the policy agent 114 receives the ship sinking request or a flashing (or flickering) blue color when the policy agent 114 receives the miss request. As such, the policy agent 114 may be configured to monitor the application requests from the application 112, and to apply the appropriate application settings of the LED display policy relating the application 112 in order to determine the command(s) for the multi-colored LED indicator unit 108. The control of the multi-colored LED indicator unit 108 may provide an enhanced user experience for applications 112 by providing visual effects for a number of different applications including gaming application or virtually any type of application 112.

Figure 2:
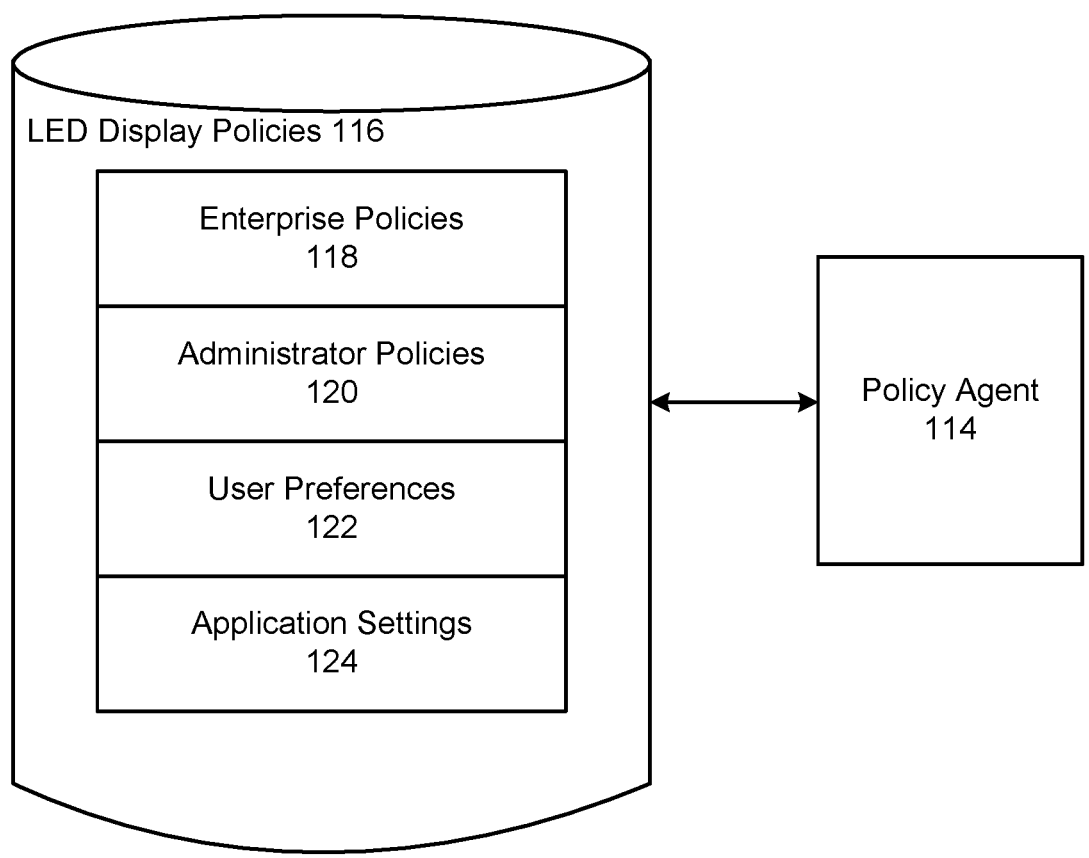
FIG. 2 illustrates a hierarchical order of the LED display policies of FIG. 1 according to an implementation.

FIG. 2 illustrates a hierarchical order of the LED display policies 116 according to an implementation. As shown in FIG. 2, the LED display policies 116 may be stored in a database, and the policy agent 114 may be configured to communicate with the database in order to determine the appropriate LED display policy to be applied. For example, the display of the color scheme may be configured according to a number of different LED display policies 116, which may conflict with one another if they are activated at the same time. As such, the implementations provide a hierarchical order of the LED display policies 116, and the policy agent 114 may determine which LED display policy 116 to apply by consulting the hierarchical order.

According to one implementation, the policy agent 114 may apply the LED display policies 116 in the following order: enterprise policies 118, administrator policies 120, user preferences 122, and application settings 124. For example, if the policy agent 114 is configured to control the multi-colored LED indicator unit 108 based on the application settings 124 (e.g., if the user is playing the battleship application) and the policy agent 114 is also configured to apply an enterprise policy 118 (e.g., the chat status example explained above), the policy agent 114 may be configured to apply the enterprise policy 118 instead of the application setting 124 because the enterprise policy 118 is ordered higher than the application setting 124.

The enterprise policies 118 may include any type of policy that is instituted by a company for users of the company's resources, e.g., the computing devices 106. As such, the enterprise policies 118 may include virtually any type of policy relating to a company wide standard indicator scheme. In one example, as explained above, the enterprise policies 118 may include the control of Internet usage by enterprise users (e.g., red=unsafe Internet browsing, yellow=cautious Internet browsing, and green=safe Internet browsing), chat status (e.g., red=busy, yellow=please be brief, and green=come and chat), and/or the number of bugs open against the user (e.g., red=one or more critical bugs, yellow=one or more non-critical bugs, green=no bugs). It is noted that these types of enterprise policies 118 are merely specific examples, where the implementations encompass any type of company wide standard indicator scheme for any type of behavior.

The administrative policies 120 may include any type of policy typically instituted by administrators of computing systems. For example, the administrative policies 120 may include one or more LED display policies that set the multi-colored LED indicator unit 108 to notify when a system update was complete, or another types of administrative policies 120. As such, the administrative policies 120 may include virtually any type of policy relating to policies handled by administrators of computing systems.

The user preferences 122 may include any type of user-defined LED display policy. For example, according to the implementations, a user of the computing device 106 may define an LED display policy based on certain types of user actions when operating the computing device 106. For example, the user may configure the multi-colored LED indicator unit 108 to display green, red, or yellow (or any other type of color) for virtually any type of computer-related user action by defining the conditions in the user preferences 122.

The application settings 124 may include any type of LED display policy relating to the applications 112. For example, the application 112 may provide one or more settings that trigger the operation of the multi-colored LED indicator unit 108 (e.g., the conditions are specified in the application itself). Alternatively, the user may define the application settings 124 for an application 112 that trigger the operation of the multi-colored LED indicator 108 (e.g., the user sets the application settings 124 via an application setting interface). As indicated above, the application 112 may include a game such as Battleship, and the application request may be related to a hit, e.g., the sinking of a ship, or a miss. Then, the multi-colored LED indicator unit 108 may be configured to display a flashing (or flickering) red color when the policy agent 114 receives the ship sinking request or a flashing (or flickering) blue color when the policy agent 114 receives the miss request. As such, the policy agent 114 may be configured to monitor the application requests from the application 112, and apply the appropriate LED display policy relating the application 112 in order to determine the command(s) for the multi-colored LED indicator unit 108.

Therefore, according to the implementations, the policy agent 114 may be configured to determine which LED display policy 116 to apply based on the hierarchical order of the LED display policies 116, which may include the enterprise policies 118, the administrator policies 120, the user preferences 122, and/or the application settings 124, for example. Not only the implementations encompass the specific order of FIG. 2, the implementations encompass any type of hierarchical ordering of the LED display policies 116. For instance, the user may wish to apply the application settings 124 over the user preferences 122 in the case that the application settings 124 are more important to the user than the user preferences 122. Also, it is noted that the LED display policies 116 may include other types of LED display policies that are not specifically characterized into a certain group. For example, besides the four types of LED display policies shown in FIG. 2, the LED display policies may include other groups of LED display policies 116. Also, the hierarchical order may include any subset of the LED display policies shown in FIG. 2.

Figure 3:
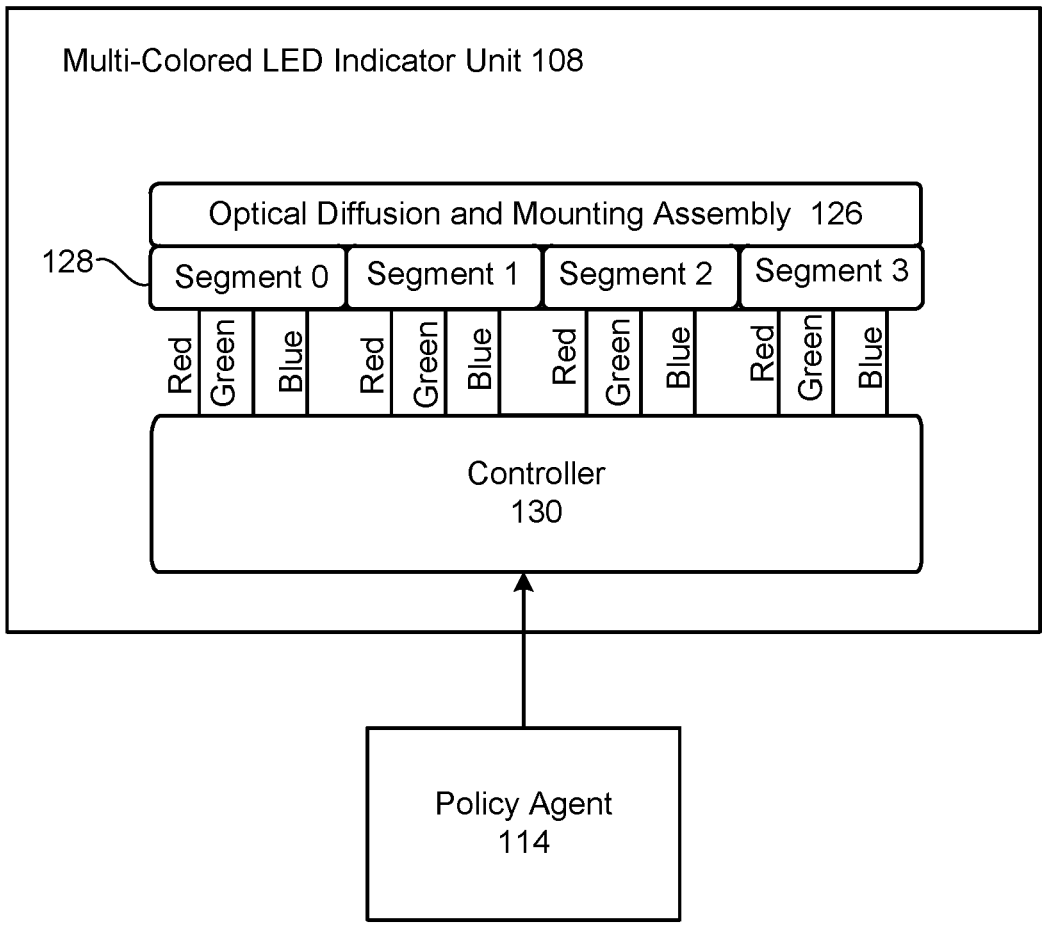
FIG. 3 illustrates the multi-colored LED indicator unit of FIG. 1 according to an implementation.

FIG. 3 illustrates the multi-colored LED indicator unit 108 of FIG. 1 according to an implementation. As shown in FIG. 3, the policy agent 114 operates in conjunction with the multi-colored LED indicator unit 108 in order to carry out the LED display policies of FIG. 2. For instance, the multi-colored LED indicator unit 108 may receive one or more commands related to the display of one or more colors of the multi-colored indicator, and control the illumination of colors. The commands may be in a format or syntax that is recognizable by a light-emitting diode for displaying the appropriate color indicated by the LED display policy.

According to an implementation, the multi-colored LED indicator unit 108 may include a controller 130, and an optical diffusion and mounting assembly 126 having a plurality of segments. The controller 130 may be an independently-provided controller that is different from the internal controllers associated with controlling single color LEDs on conventional computing devices. The controller 130 may receive the command(s) from the policy agent 114, and provide the LED-level instructions to the optical diffusion and mounting assembly 126 for displaying the appropriate colors. The LED-level instructions may provide information indicating the appropriate emission pattern(s) for the desired color and illumination.

The plurality of segments may include four independent LED segments such as segment 0, segment 1, segment 2, and segment 3, where each segment is capable of independently displaying a color. As such, the plurality of segments may provide the capability of displaying multiple colors at the same time. In one example, the multi-colored LED indicator unit 108 may utilize a Red Green Blue (RGB) color scheme, which permits the illumination of a range of different colors by blending amounts of red, green, and/or blue. According to the implementations, each segment is associated with the RGB color scheme, and at least one of the segments (or all of them) may be provided with the appropriate emission(s) for the desired color and illumination as dictated by the LED display policy. Also, the optical diffusion and mounting assembly 126 may include other components related to each segment such as the corresponding RGB diodes and related mounting hardware. Further, although four segments are illustrated in FIG. 3, the implementations encompass any number of segments in the optical diffusion and mounting assembly 126.

Figure 4:
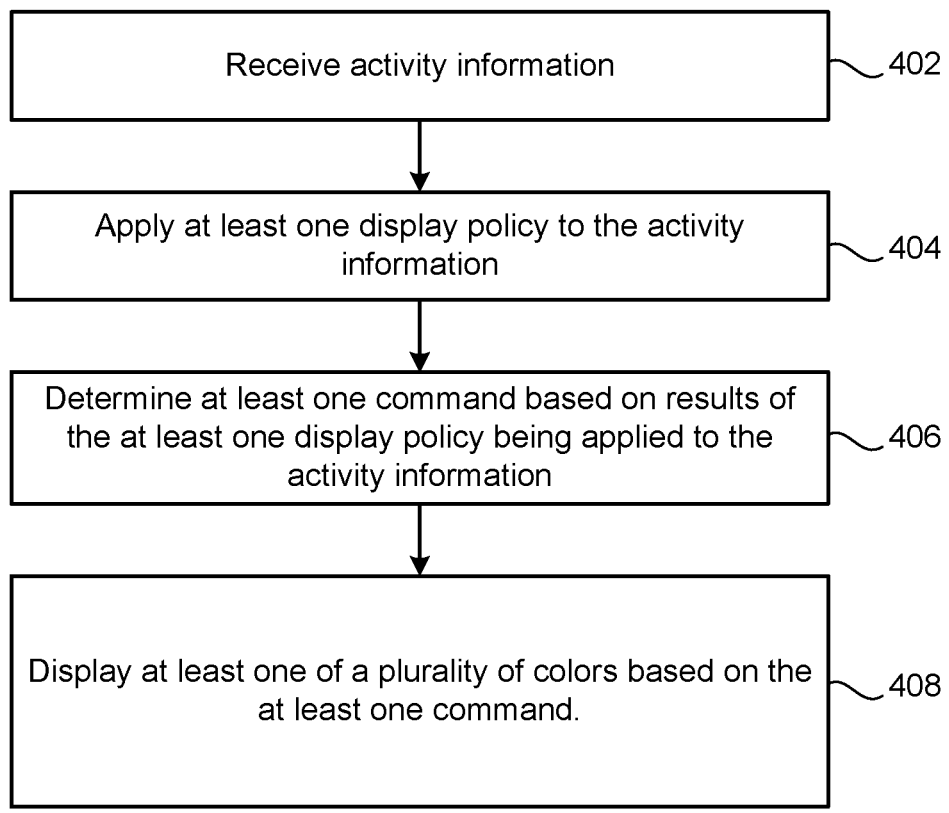
FIG. 4 is a flowchart illustrating example operations of the computing device of FIG. 1 according to an implementation.

FIG. 4 is a flowchart illustrating example operations 402-408 of the computing device 106 of FIG. 1 according to an implementation. Although the flowchart of FIG. 4 illustrates the operations 402-408 in sequential order, it will be appreciated that this is merely an example, and that additional or alternative operations may be included. Further, operations of FIG. 4 and related operations may be executed in a different order than that shown, or in a parallel or overlapping fashion.

Activity information may be received (402), at least one display policy may be applied to the activity information (404), and at least one command may be determined based on results of the at least one display policy being applied to the activity information (406). For example, the policy agent 114 may be configured to receive activity information, apply at least one LED display policy among a plurality of LED display policies 116, and determine at least one command based on the results of the at least one LED display policy being applied to the activity information. The determined command(s) are provided to the multi-colored LED indictor unit 108 for displaying the color scheme.

In one implementation, the activity information may include network activity information associated with the private network 104 and/or the Internet 102. In this example, the policy agent 114 may receive the network activity information from the private network 104 and/or the Internet 102, and apply at least one LED display policy to the network activity information. In particular, the policy agent 114 may receive the network information indicating which websites the user is viewing, and apply the LED display policy accordingly. Based on the application of the LED display policy to the network information, the policy agent 114 may determine the appropriate command(s) to be provided to the multi-colored LED indicator unit 108. Also, the LED display policy may relate to a parental control policy. In one implementation, the policy agent 114 may operate in conjunction with existing network filtering mechanisms already associated with the operating system and/or web browsers or search engines. In this example, the policy agent 114 may be notified when the filtering mechanism is activated causing the policy agent 114 to apply the parental control policy to the type of Internet activity classified by the network filtering mechanism.

In another implementation, the activity information may include user action information indicating at least one user action. For example, the policy agent 114 may be configured to receive user action information that represents an action by the user on the computing device 106. When the user action information meets a condition specified by the LED display policy, the policy agent 114 may generate the appropriate command(s) to be provided to the multi-colored LED indicator unit 108 for controlling the display of color indicators.

In another implementation, the LED display policy may represent an enterprise policy to be applied to users, who are authorized to operate a company's computers. For example, enterprise users may set a company wide standard indicator scheme such as chat status, e.g., red=busy, yellow=please be brief, and green=come and chat. The policy agent 114 may receive the selected chat status and determine the appropriate command(s) for controlling the multi-colored LED indicator unit 108 based on the enterprise's LED display policy. In another example, the enterprise LED display policy may relate to the number of bugs open against the user, e.g., red=one or more critical bugs, yellow=one or more non-critical bugs, green=no bugs. Also, the enterprise LED policy may relate to the status of a system update, e.g., red=the system update is taking place, and green=the system update is complete. As such, the activity information may relate to maintenance upgrade information or a number of errors associated with the computing device 106. Therefore, the policy agent 114 may receive the maintenance upgrade information or the number of errors associated with the computing device 106 from the computing device 106 or another device, and apply the enterprise LED policy to determine the appropriate command(s) for controlling the multi-colored LED indictor unit 108.

Furthermore, the policy agent 114 may receive one or more application requests from an application 112. As such, the policy agent 114 may be configured to monitor the application requests from the application 112, and apply the appropriate application settings of the LED display policy relating the application 112 in order to determine the command(s) for the multi-colored LED indicator unit 108.

At least one of a plurality of colors may be displayed based on the at least one command (408) via the multi-colored LED indicator unit 108, which may be located on a non-display screen area of the computing device 106. For example, the policy agent 114 may operate in conjunction with the multi-colored LED indicator unit 108 in order to carry out the LED display policies of FIG. 2. For instance, the multi-colored LED indicator unit 108 may receive one or more commands related to the display of colors of the multi-colored indicator, and control the illumination of colors. The commands may be in a format or syntax that is recognizable by a light-emitting diode for displaying the appropriate color indicated by the LED display policy. The location of the multi-colored LED indicator 108 is further explained with reference to FIGS. 5 and 6.

According to an implementation, the multi-colored LED indicator unit 108 may include a controller 130, and an optical diffusion and mounting assembly 126 having a plurality of segments, where each segment of the plurality of segments is capable of independent displaying a color. The controller 130 may receive the command(s) from the policy agent 114, and provide the LED-level instructions to the optical diffusion and mounting assembly 126 for displaying the appropriate colors. The LED-level instructions may provide information indicating the appropriate emission pattern(s) for the desired color and illumination.

The plurality of segments may include four independent LED segments such as segment 0, segment 1, segment 2, and segment 3, where each segment is capable of independently displaying a color. As such, the plurality of segments may provide the capability of displaying multiple colors at the same time. In one example, the multi-colored LED indicator unit 108 may utilize a Red Green Blue (RGB) color scheme, which permits the illumination of a range of different colors by blending amounts of red, green, and/or blue. According to the implementations, each segment is associated with the RGB color scheme, and at least one of the segments (or all of them) may be provided with the appropriate emission(s) for the desired color and illumination as dictated by the LED display policy.

Figure 5A:
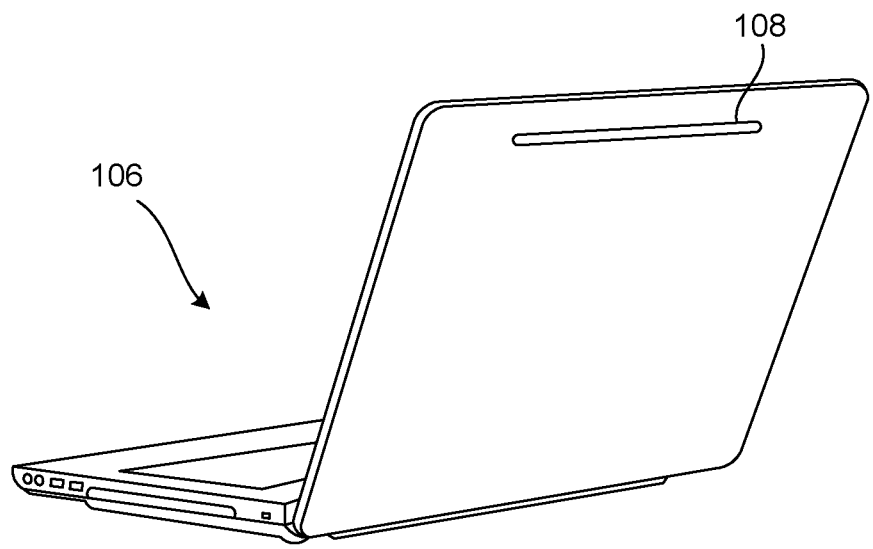
FIG. 5A illustrates the computing device of FIG. 1 as a laptop computer according to an implementation.
Figure 5B:
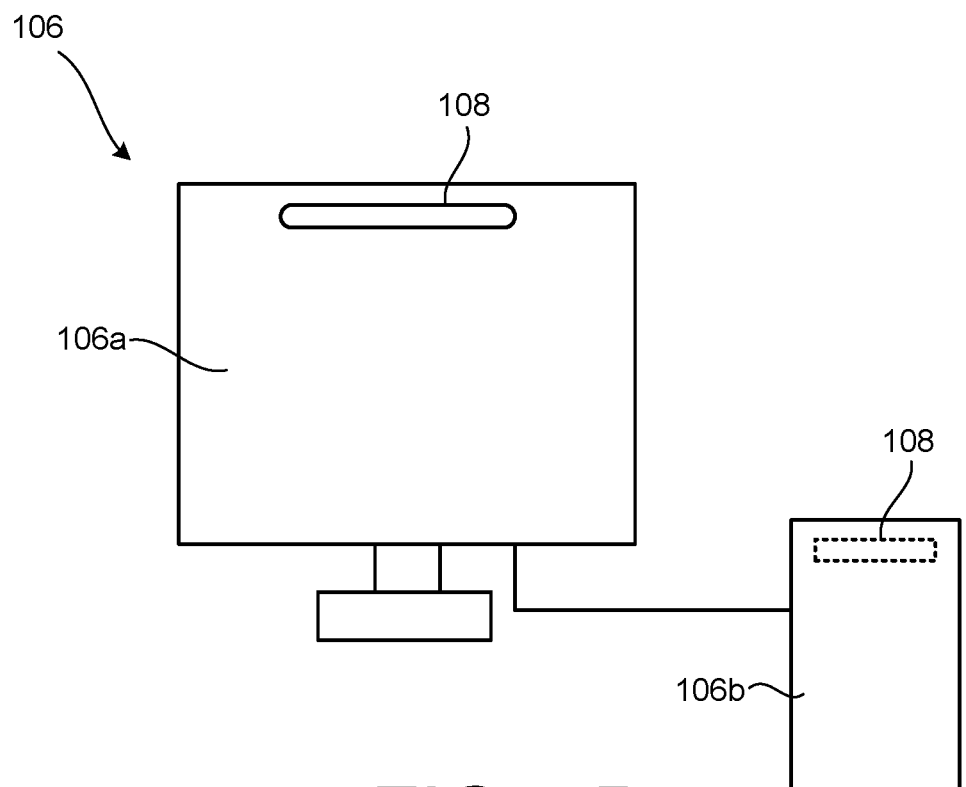
FIG. 5B illustrates the computing device of FIG. 1 as a desktop computer according to an implementation.

FIG. 5A illustrates the computing device 106 of FIG. 1 as a laptop computer according to an implementation. Referring to FIG. 5A, the laptop computer includes the multi-colored LED indicator unit 108, where the multi-colored LED indicator unit 108 is located on a non-display screen area of the laptop computer, where the non-display screen area includes a backside of the laptop computer opposite to the display screen portion. For example, the multi-colored LED indicator unit 108 may be located on the upper backside of the laptop computer, and the display of one or more colors may be visible from the location of the multi-colored LED indicator unit 108. However, the implementations encompass any location on the laptop computer for the placement of the multi-colored LED indicator unit 108. FIG. 5B illustrates the computing device 106 of FIG. 1 as a desktop computer according to an implementation. Referring to FIG. 5B, the desktop computer may have a display apparatus 106*a* providing a display screen and a computer processing unit (CPU) 106*b*. According to one implementation, the multi-colored LED indicator unit 108 may be located on the backside or the front-side of the display apparatus 106*a*. Alternatively, the multi-colored LED indicator unit 108 may be located on the CPU 106*b*.

Figure 6:
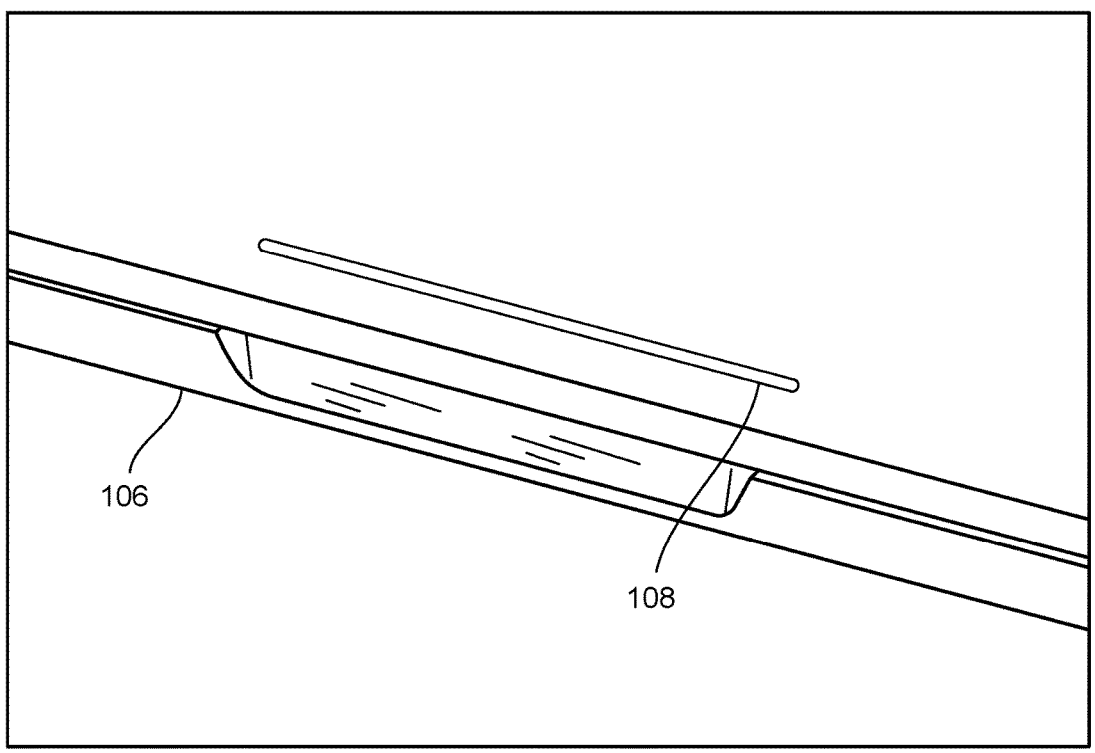
FIG. 6 illustrates the computing device of FIG. 1 as the laptop computer according to another implementation.

FIG. 6 illustrates the computing device 106 of FIG. 1 according to another implementation. For example, FIG. 6 illustrates the computing device 106 as the laptop computer, and the laptop computer is in a closed state (e.g., where the display screen portion and the keyboard portion are folded together). As shown in FIG. 6, the multi-colored LED indicator unit 108 is located on the backside towards the outer edge of the laptop computer. Again, the locations of the multi-colored LED indicator unit 108, as shown in FIGS. 5-6, are merely examples, where the implementations encompass any location of the multi-colored LED indicator unit 108 on the computing device 106.

It will be appreciated that the above implementations that have been described in particular detail are merely example or possible implementations, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computing device, comprising:
  a display unit having a front portion and a back portion, the front portion including a display screen, the back portion being opposite to the front portion;
  a policy agent configured to receive activity information, apply at least one display policy to the activity information, and determine at least one command based on results of the at least one display policy being applied to the activity information; and
  a multi-colored indicator unit, located on the back portion of the display unit, configured to display at least one of a plurality of colors to a non-user of the computing device based on the at least one command,
  wherein the multi-colored indicator unit includes a plurality of independent light emitting diode (LED) segments including a first LED segment and a second LED segment, wherein each of the first LED segment and the second LED segment is capable of independently displaying Red, Green, and Blue, the first LED segment configured to display a color at a same time as the second LED segment displays a color.

2. The computing device of claim 1, wherein the at least one display policy includes at least one of an enterprise policy, an administrator policy, a user preference, and an application setting.

3. The computing device of claim 1, wherein the policy agent is further configured to determine which display policy to apply based on a hierarchical order of a plurality of display policies.

4. The computing device of claim 1, wherein the computing device is a laptop computer.

5. The computing device of claim 1, wherein the computing device is a desktop computer having the display unit connected to a computer processing unit.

6. The computing device of claim 1, wherein the multi-colored indicator unit further includes an optical diffusion and mounting assembly having the plurality of LED segments.

7. The computing device of claim 1, wherein the activity information includes Internet activity, and the at least one display policy includes an Internet usage control policy relating to control of the Internet activity, wherein the policy agent is configured to apply the Internet usage control policy to the Internet activity and determine the at least one command based on results of the Internet usage control policy being applied to the Internet activity.

8. The computing device of claim 1, wherein the at least one display policy includes a parental control policy relating to Internet browsing activities of the user of the computing device.

9. The computing device of claim 8, wherein the policy agent is configured to operate in conjunction with an existing network filtering mechanism associated with an operating system or web browser of the computing device such that the policy agent is notified when the existing network filtering mechanism is activated causing the policy agent to apply the parental control policy to a type of Internet activity classified by the existing network filtering mechanism.

10. The computing device of claim 1, wherein the activity information includes user action information indicating at least one user action.

11. The computing device of claim 1, wherein the activity information includes an application request from an application executing on the computing device.

12. The computing device of claim 1, wherein the activity information includes maintenance upgrade information or a number of errors associated with the computing device.

13. A method for controlling and displaying colors via an indicator on a computing device, comprising:
  receiving, by a policy agent of the computing device, activity information;
  applying, by the policy agent, at least one display policy to the activity information;
  determining, by the policy agent, at least one command based on results of the at least one display policy being applied to the activity information; and
  displaying, by a multi-colored indicator unit located on a back-side of a display unit opposite to a display screen of the computing device, at least one of a plurality of colors to a non-user of the computing device based on the at least one command,
  wherein the multi-colored indicator unit includes a plurality of independent light emitting diode (LED) segments including a first LED segment and a second LED segment, wherein each of the first LED segment and the second LED segment is capable of independently displaying Red, Green, and Blue, the first LED segment configured to display a color at a same time as the second LED segment displays a color.

14. The method of claim 13, wherein the at least one display policy includes a plurality of display policies including an enterprise policy, an administrator policy, a user preference policy, and an application policy.

15. The method of claim 14, further comprising:
determining, by the policy agent, which display policy to apply based on a hierarchical order of the plurality of display policies, wherein, when the enterprise policy and the application policy are both relevant to a current display of the multi-colored indicator unit, selecting the enterprise policy over the application policy.

16. The method of claim 13, wherein the activity information includes Internet activity, and the at least one display policy includes an Internet usage control policy relating to control of the Internet activity.

17. The method of claim 13, wherein the plurality of independent LED segments further includes a third LED segment and a fourth LED segment.

* * * * *